(12) United States Patent
Shanley

(10) Patent No.: US 8,763,132 B2
(45) Date of Patent: Jun. 24, 2014

(54) OPEN SOURCE SECURITY MONITORING

(75) Inventor: Robert J. Shanley, Lake Elmo, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/524,886

(22) Filed: Jun. 15, 2012

(65) Prior Publication Data

US 2013/0340082 A1    Dec. 19, 2013

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC ......................................................... 726/25

(58) Field of Classification Search
USPC ......................................................... 726/25
See application file for complete search history.

(56) References Cited

U.S. PATENT DOCUMENTS

| | | | |
|---|---|---|---|
| 7,974,994 B2 | 7/2011 | Li et al. | |
| 2005/0004863 A1* | 1/2005 | Havrilak | 705/38 |
| 2010/0076957 A1 | 3/2010 | Staddon et al. | |
| 2010/0306852 A1* | 12/2010 | Adar | 726/25 |
| 2011/0225115 A1* | 9/2011 | Moitra et al. | 706/50 |
| 2012/0017278 A1* | 1/2012 | Fisher et al. | 726/24 |
| 2012/0041901 A1* | 2/2012 | Zhao et al. | 706/10 |
| 2013/0046771 A1* | 2/2013 | Moitra et al. | 707/749 |

OTHER PUBLICATIONS

Cyveillance, "Online Monitoring for Information Protection", Cyveillance a QinetiQ Company, Accessed Jun. 15, 2012, http://www.cyveillance.com/web/solutions/info-protect.php (2 pages).
Zecurion, "Don't Let Your Sensitive Information Leak onto Social Networks", Zecurion Treats International Threats, Accessed Jun. 15, 2012, http://www.zecurion.com/uploads/Do%20not%20Let%20Your%20Sensitive%20Information%20Leak%20onto%20Social%20Networks.pdf (7 pages).

* cited by examiner

*Primary Examiner* — Kambiz Zand
*Assistant Examiner* — Stephen Sanders
(74) *Attorney, Agent, or Firm* — Brooks, Cameron & Huebsch, PLLC

(57) ABSTRACT

Systems, methods, and devices for open source security monitoring are described herein. For example, one or more embodiments include searching open source data for data posing a security vulnerability to an entity, associating a risk level with the data posing the security vulnerability to the entity, and determining whether to perform a remedial action based on the risk level.

20 Claims, 4 Drawing Sheets

OPEN SOURCE SECURITY MONITORING

TECHNICAL FIELD

The present disclosure relates to open source security monitoring.

BACKGROUND

Data can be an important asset for individuals and businesses alike. For example, an individual's identification, assets, and/or private information can be formed of data. Alternatively, and/or in addition, a business's operating strategies, confidential product information, marketing materials, and/or employee information can be formed of data. With the advent of the Internet, individuals and/or businesses can store this data and/or share this data with others via the Internet.

DETAILED DESCRIPTION

Figure 1:
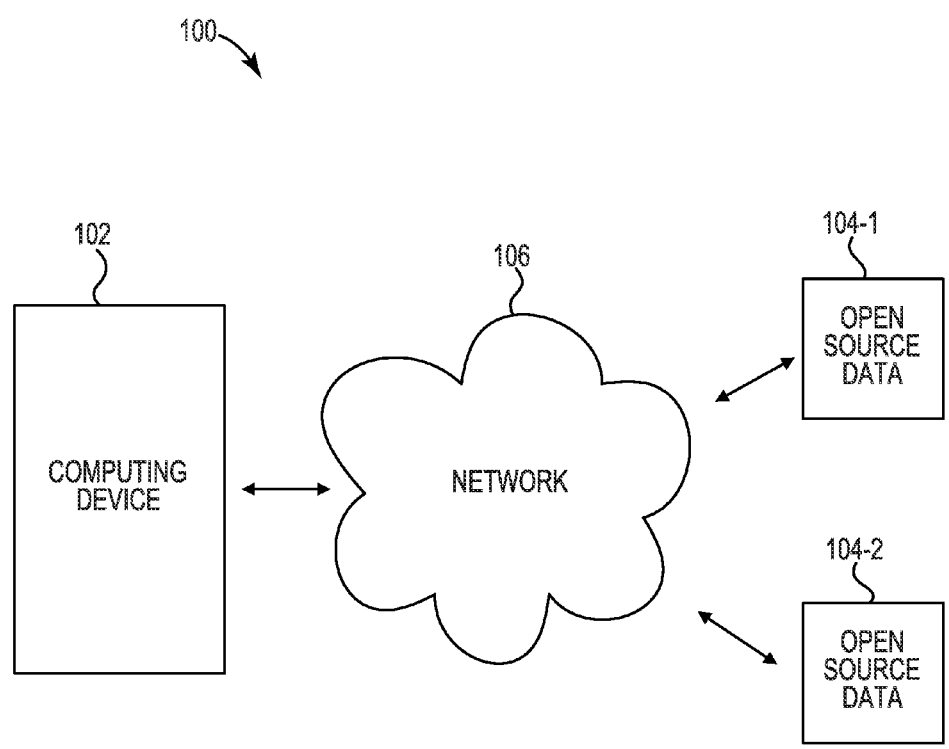
FIG. 1 illustrates a system for open source security monitoring according to one or more embodiments of the present disclosure.

Systems, methods, and devices for open source security monitoring are described herein. For example, one or more embodiments include searching open source data for data posing a security vulnerability to an entity, associating a risk level with the data posing the security vulnerability to the entity, and determining whether to perform a remedial action based on the risk level.

With the advent of the Internet, individuals and/or businesses have been introduced to new benefits provided by the functionality of the services that are associated with the Internet. For example, services have been developed to store data associated with the individual and/or business online (e.g., online repositories). Services have been developed to share data with other individuals and/or businesses via social networking sites and/or postings made via web pages, for example.

However, the benefits provided by these services also cause detriments. In an example, data can be purposefully and/or inadvertently shared via the Internet. As a result, valuable data can enter the public domain, causing security vulnerabilities and/or financial loss, for example.

Some embodiments of the present disclosure can help provide awareness to an entity that data associated with the entity has been shared. In an example, some embodiments of the present disclosure can search open source data for data posing a security vulnerability to the entity.

The data posing the security vulnerability can, in an example, be located at a single source. Alternatively, and/or in addition, pieces of data can be located at multiple sources and can pose the security vulnerability when the pieces of data are combined. For example, each piece of data located at each of the multiple sources can be innocuous by itself, but can pose a security vulnerability when combined with the other pieces of data from the multiple sources. This can pose a challenge, because each of the individual pieces of data may not be easily identifiable as posing a security vulnerability and therefore, it may be difficult to recognize that a security vulnerability exists.

Some embodiments of the present disclosure can analyze data from different sources and determine whether the data in combination can pose a security vulnerability. A risk level can be associated with the security vulnerability and a determination of whether a remedial action should be performed can be made.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 210 may reference element "10" in FIG. 1, and a similar element may be referenced as 410 in FIG. 4.

As will be appreciated, elements shown in the various embodiments herein can be added, exchanged, and/or eliminated so as to provide a number of additional embodiments of the present disclosure. As used herein, "a number of" refers to one or more. In addition, as will be appreciated, the proportion and the relative scale of the elements provided in the figures are intended to illustrate the embodiments of the present invention, and should not be taken in a limiting sense.

FIG. 1 illustrates a system for open source security monitoring according to one or more embodiments of the present disclosure. The system 100 can include a computing device 102, discussed further in relation to FIG. 3, a first source of open source data 104-1, and a second source of open source data 104-2, collectively referred to as open source data 104. Computing device 102 and open source data 104 can be connected via a network 106. The network 106 can be the Internet and/or a private network belonging to an entity, for example. The entity can be defined as an individual, group of individuals, and/or a business.

In an example, the first source of open source data 104-1 and/or the second source of open source data 104-2 can be a social networking site, a job posting, a message board, a blog, a comment (e.g., from a blog, from an article), an online document repository, metadata from an online document, a web page, a computer search engine (e.g., Shodan), people and organizational databases (e.g., Spokeo, Xing, 123people), security vulnerability disclosure sources (e.g., Exploit Database), infrastructure information (e.g., Domain Name System Names, Top Level Domain Names, WHOIS Database Listing), public data and records, support materials (e.g., portals, online documentation, forums), and/or web search engines accessed via search engine Application Programming Interfaces (API) (e.g., Google, WolframAlpha, Bing). The sources of the open source data 104 can be the same and/or different.

The computing device 102 can monitor a first piece of innocuous data from a first source of open source data 104-1. The innocuous data can be defined as data that, by itself, does not pose a security vulnerability to an entity. However, the innocuous data can be combined with other innocuous data to cause a security vulnerability, in an example.

A security vulnerability can be defined as an occurrence that can cause a loss of data belonging to the entity. For example, data associated with the entity can be leaked intentionally and/or unintentionally. The data associated with the entity can be exploited, for example, to gain access to the entity (e.g., a system of the entity, a network of the entity) and/or cause financial injury to the entity, for example.

The computing device 102 can monitor a second piece of innocuous data from a second source of open source data 104-2. In an example, the first piece of innocuous data and the second piece of innocuous data in combination can cause a security vulnerability. For example, the first and second piece of innocuous data can be data associated with the entity (e.g., individual, business), project, and/or product that the entity is working on.

The first piece of innocuous data can include vague details about the entity, project, and/or product on a first source of open source data 104-1. The second piece of innocuous data can also include vague details about the entity, project, and/or product on a second source of open source data 104-2. While neither the first or second piece of innocuous data, individually, cause a security vulnerability, the first and second piece of innocuous data can be combined to cause the security vulnerability.

Such a circumstance may occur where two employees of the entity post data regarding the entity, project, and/or product to different sources of open source data 104 (e.g., blog, forum, etc.), but neither employee leaks enough detail about the product and/or project for either post to cause a security vulnerability, individually. However, when the posts are combined (e.g., read together), a security vulnerability can be caused.

In some embodiments, the computing device 102 can associate the first piece of innocuous data with the second piece of innocuous data. In an example, keywords from the first piece of innocuous data and/or second piece of innocuous data can be used by the computing device 102 to associate the first piece of innocuous data with the second piece of innocuous data. For example, an entity name, project name, and/or employee name can be mentioned in both of the posts and can be used for association of the first and second piece of innocuous data.

The computing device 102 can associate a risk level with the security vulnerability, as discussed herein. In an example, a keyword can be identified from the first piece of innocuous data and/or the second piece of innocuous data. For example, the keyword can be a password, name of a product, product information, name of a project and/or project information, each of which can be innocuous data if not associated with further data (e.g., name, username, etc.). The computing device 102 can recognize the keyword and associate the risk level with the innocuous data based on the keyword and/or portions of the innocuous data.

In some embodiments, the computing device 102 can determine whether to perform a remedial action based on the risk level. For example, if the risk level associated with the security vulnerability is above a predetermined level, a remedial action can be performed. The remedial action can include an action that provides present and/or future remediation of the security vulnerability.

Present remediation of the security vulnerability can include, for example, providing an identification of the source of the open source data 104 so a user can locate the security vulnerability and remove the security vulnerability. For instance, a request can be automatically sent to an administrator of the source of the open source data 104 to direct the administrator to remove the security vulnerability.

Future remediation can include developing an internet posting policy. In an example, data associated with security vulnerabilities can be stored by the computing device 102 and analyzed to develop recommendations for the internet posting policy. Alternatively, and/or in addition, the stored data can be analyzed by a user and used to develop the recommendations for the internet posting policy.

In an example, the data associated with the security vulnerabilities stored by the computing device 102 can be used to train users. For instance, security vulnerabilities that have occurred in the past can presented to a user to demonstrate how security vulnerabilities are created and/or how to avoid causing a security vulnerability.

In some embodiments, the computing device 102 can provide a measure of how effective user training and/or the internet posting policy is. In an example, the computing device 102 can track a number of and/or risk level of the security vulnerabilities that occur. As used herein, a number of refers to one or more. Based on whether the number of and/or risk level of the security vulnerabilities increases and/or decreases after implementing the remedial actions, an effectiveness of the remedial actions can be measured and adjustments can be made to the remedial actions based on their effectiveness.

In some embodiments, a plurality of security vulnerabilities may exist. As such, risk levels can be assigned to each of the plurality of security vulnerabilities and a determination of whether to perform a plurality of remedial actions on the respective security vulnerabilities based on the risk level can be made. In an example, the plurality of remedial actions can be prioritized based on the risk level of each of the security vulnerabilities. For instance, a first remedial action associated with a first security vulnerability can have a lower risk level than a second remedial action associated with a second security vulnerability. As such, the second remedial action can be performed before the first remedial action.

Figure 2:
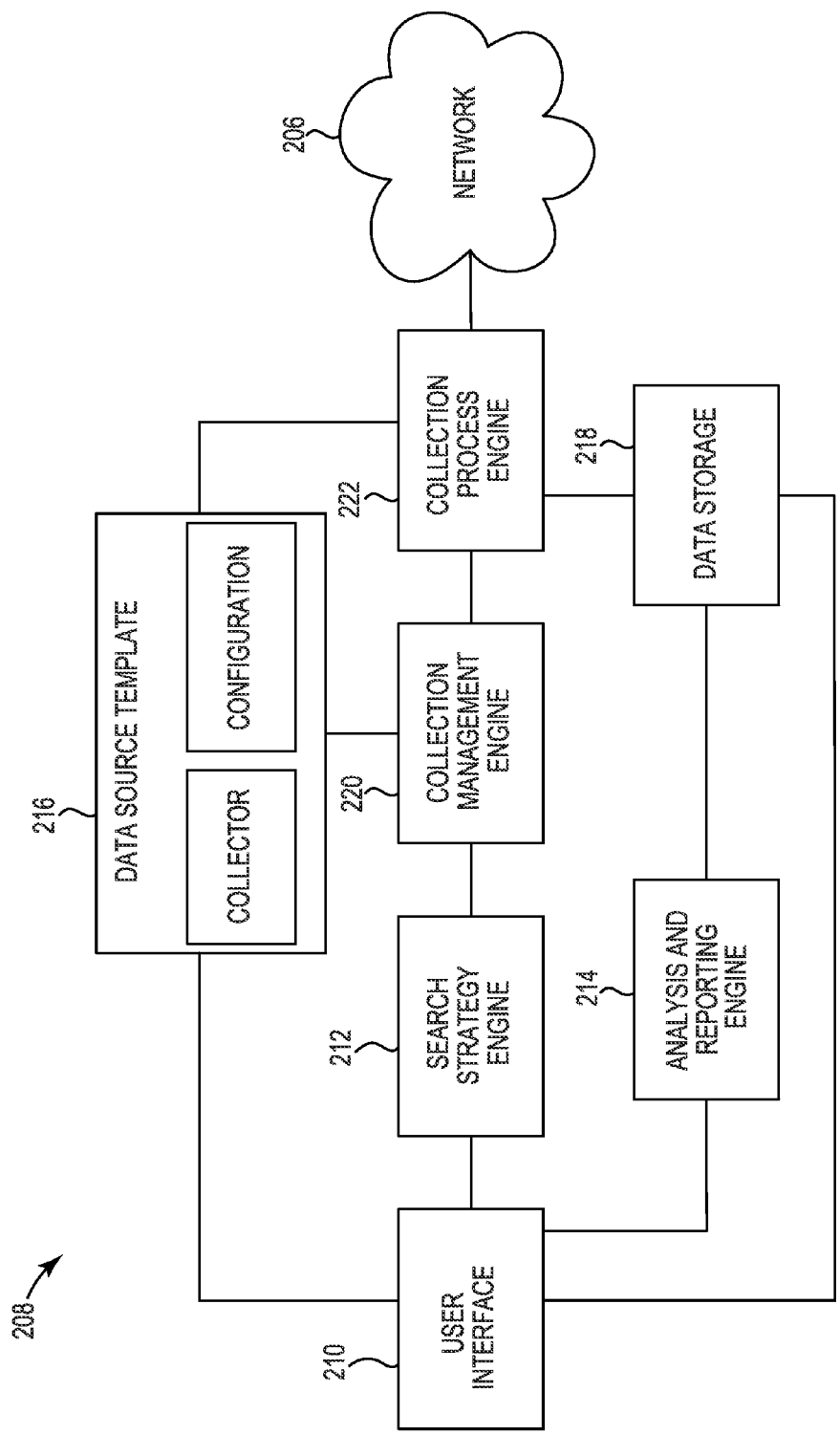
FIG. 2 illustrates a flow chart associated with open source security monitoring according to one or more embodiments of the present disclosure.

FIG. 2 illustrates a flow chart associated with operating a system for open source security monitoring (e.g., system 100 discussed in connection with FIG. 1) according to one or more embodiments of the present disclosure. For example, flow chart 208 can be used (e.g., by a number of computing devices discussed in connection with FIGS. 1 and 4) to perform open source security monitoring according to one or more embodiments of the present disclosure. Flow chart 208 includes a user interface 210 in communication with a search strategy engine 212, an analysis and reporting engine 214, data source template 216, and data storage 218.

The search strategy engine 212 can include scheduling parameters and/or search configuration parameters that form a search strategy for searching open source data. For example, scheduling parameters can include parameters that define when a search of open source data is performed (e.g., hourly, daily, weekly). Search configuration parameters can include a keyword, for example, for searching open source data. The search strategy engine 212 can be loaded with default scheduling parameters and/or search configuration parameters. For example, the search strategy engine 212 can be loaded with a search strategy that includes a set of queries and/or keywords that apply to projects being worked on by an entity. Alternatively, and/or in addition, the search strategy engine 212 can be loaded with a search strategy that includes scheduling parameters.

The user interface 210 can be used to configure the search strategy engine 212. For example, the user interface 210 can be used to select the parameters that specify when the search of open source data is performed. Alternatively, and/or in addition, the user interface 210 can be used to select the keyword that is used for searching open source data. For instance, a name of the entity, a project name, and/or a person's name can be used to limit the search of data relevant to the entity. In an example, the user can configure which keywords are mandatory and which keywords are optional for obtaining results when searching open source data.

The user can select a search strategy that has been loaded on the search strategy engine and/or can program a search strategy through the user interface 210. For example, the user can select a default time and/or keyword that has been loaded on the search strategy engine through the user interface 210. Alternatively, and/or in addition, the user can define a custom search through the user interface 210 by entering custom keywords and/or custom times that have not been loaded on the search strategy engine 212.

The analysis and reporting engine 214 can perform an analysis on data that has been collected and/or stored in data storage 218. For example, the analysis and reporting engine 214 can associate the first piece of innocuous data with the second piece of innocuous data. Alternatively, and/or in addition, the analysis and reporting engine can associate a risk level with the security vulnerability.

In some embodiments, the analysis and reporting engine 214 can determine whether to perform a remedial action based on the risk level. For example, the analysis and reporting engine 214 can send an alert to the user interface, for example. The analysis and reporting engine 214 can generate reports that include results from open source security monitoring. For example, trends of security vulnerabilities (e.g., an increase and/or decrease in the number of security vulnerabilities occurring) can be included in the generated reports.

The analysis and reporting engine 214 can also allow for configuration of generated reports and scheduling of generated reports through the user interface 210, for example. For example, the generated reports can be configured to include particular data regarding the security vulnerabilities. Alternatively, and/or in addition, the generated reports can be created based on a schedule. For instance, the generated reports can be created hourly, daily, weekly, etc.

In some embodiments, the analysis and reporting engine 214 can analyze the search strategy and make improvements to the search strategy based on past and/or current analysis on the data that has been collected and/or stored. In an example, the analysis and reporting engine 214 can add, delete, and/or modify a keyword that is used in the search strategy. For instance, if a particular piece of data (e.g., word and/or number) shows up in open source data in addition to a project name, for example, the particular piece of data can be identified and included in further searches for security vulnerabilities.

The data source template 216 can include a collector component and configuration component. In an example, each data source (e.g., open source data) that is searched can include a data source template 216. The collector component can be an application programming interface (API), for example, and can be used to gather data from its data source. For example, if the data source is a social networking site, the collector component can be an implementation of the social networking site API that can query the infrastructure of the social networking site for data.

The configuration component can include configuration data that can be used by the collector component to run. For example, the configuration component can include a username and/or password to access a password protected data source. Alternatively, and/or in addition, the configuration component can include limits and timeouts. Timeouts can include a time associated with how long the collector component attempts to gather data from a data source before ceasing attempts to gather the data. Limits can include limits on the amount of data that is collected by the collector component.

The user interface 210 can be used to enable, disable, and/or configure data source template 216. For example, if a user wishes to search a particular data source, a selection can be made on the user interface 210 to enable the data source template 216 for that data source. If a user wishes to disable a particular data source, a selection can be made on the user interface 210 to disable the data source template 216 for that data source. The data source template 216 can also be configured through the user interface 210. For example, an authentication credential (e.g., password, username) for a data source can be added to the configuration component.

The flow chart includes a collection management engine 220 in communication with the search strategy engine 212, the data source template 216, and a collection process engine 222. The collection management engine 220 can receive the search strategy from the search strategy engine 212 and/or receive details associated with a data source from data source template 216. Based on the received search strategy and the details associated with the data source, the collection management engine 220 can issue commands to the collection process engine 222. In return, the collection process engine 222 can issue status updates to the collection management engine 220. For example, a status update can be issued that indicates that a search strategy received from the collection management engine 220 was executed.

The collection management engine 220 can be used to control the collection process engine 222. In an example, the collection management engine 220 can direct the collection process engine 222 to start and/or stop collecting data from the network 206. For instance, in response to the status update that the search strategy was executed, the collection management engine 220 can issue a command to the collection process engine 222 to stop collecting data from a particular source, for example.

In some embodiments, the collection process engine 222 can execute the collector component on the data source template 216 to collect data. In an example, the collector component can issue a query and an API command to network 206 (e.g., web resources) and receive responses from the network 206.

Data collected in the collection process engine can be stored in data storage 218. The data storage 218 can provide responses to queries from the analysis and reporting engine 214 and the user interface 210.

In some embodiments, the flow chart 208 can include a metadata extractor. The metadata extractor can process files, documents, and/or media downloaded by the collection process engine 222. For example, metadata (e.g., usernames, email addresses, software versions, geolocation data, etc.) included in the files, documents, and/or media can be processed by the metadata extractor and stored in data storage 218.

In some embodiments, the components of the flow chart 208 (e.g., user interface 210, search strategy engine 212, analysis and reporting engine 214, data source template 216, data storage 218, collection management engine 220, collection process engine 222, can be located on the same and/or different computing devices. For example, the user interface 210 can be located on a first computing device, the data storage can be located on a second and third computing device, and the rest of the components can be located on a fourth computing device.

Figure 3:
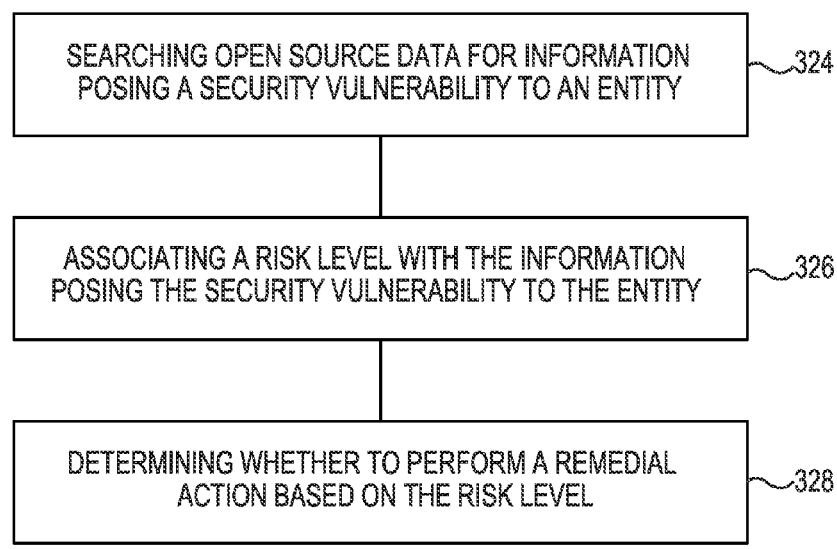
FIG. 3 illustrates a method for open source security monitoring according to one or more embodiments of the present disclosure.

FIG. 3 illustrates a method for open source security monitoring according to one or more embodiments of the present disclosure. The method includes, at block 324, searching open source data for data posing a security vulnerability to an entity. In an example, the open source data can be searched for keywords and/or a combination of keywords that indicate a security vulnerability to an entity. Examples of the data can include a document, media (e.g., pictures, videos) metadata, an advisory, a vulnerability, a disclosure, an email address, a username, a software version, a vulnerable server, a vulnerable web application, a sensitive directory, web server detection, an error message, a file containing sensitive information, a file containing a username, a files containing a password, network and vulnerability data (e.g., a firewall log, a honeypot log, network information, an intrusion detection system log), and/or a login page.

In some embodiments, the method can include analyzing data from a single source of open source data. Alternatively, and/or in addition, the method can include analyzing data from multiple sources of open source data. In an example, the sources of the open source data can be different. For example, data from a forum can be analyzed in relation to data from a blog.

The method can include determining whether a combination of the data from the multiple sources of open source data pose a security vulnerability. In an example, the individual data from each of the multiple sources of open source data can be innocuous. For instance, the data, by itself, does not pose a security vulnerability to the entity. However, the data from the multiple sources of open source data, in combination, can pose a security vulnerability to the entity, as discussed herein.

In some embodiments, the method can include continuously searching open source data for data posing a security vulnerability to the entity. In an example, by performing continuous searching, security vulnerabilities can be identified more quickly than if searching is performed periodically (e.g., weekly, monthly, etc.).

In some embodiments, the method can include searching open source data for data associated with an entity. In an example, data associated with the entity can also contain data that can pose a security vulnerability to the entity. For instance, if an individual mentions an entity's name in a post on a forum, a possibility exists that the post can contain data that poses a security vulnerability to the entity. As such, by searching for data that is associated with an entity, possible security vulnerabilities can be identified.

In an example, the method can include identifying data associated with the entity through keywords. For instance, if the entity is a business, names of employees and/or the business name can be used to search for data associated with the entity. If the entity is an individual, a name of the individual and/or identifying characteristics of the individual (e.g., user name, telephone number, social security number) can be used to search for data associated with the entity.

In some embodiments, the method can include searching open source data for data associated with a project and/or product. In an example, data associated with the project and/or product can also contain data that can pose a security vulnerability to the project and/or product. For instance, a confidentiality of the project and/or product can be breached due to confidential details that are disclosed in the data.

If an individual mentions a project and/or product name, for example, in a post on a forum, a possibility exists that the post can contain data that poses a security vulnerability to the project and/or product. As such, by searching for data that is associated with the project and/or product, possible security vulnerabilities can be identified.

In an example, the method can include identifying data associated with the project and/or product through keywords. For instance, keywords can include a project and/or product name, project and/or product release date, and/or names of individuals working on the project and/or product, for example.

The method includes associating a risk level with the data posing the security vulnerability to the entity, at block 326. The risk level can be defined with respect to keywords that can be searched for in the open source data. In an example, a first keyword that includes a first project name can be assigned a higher risk level than a second keyword that includes a second project name. Recognizing the first keyword while searching the open source data can result in associating the data associated with the first keyword with the risk level assigned to the first keyword, for example.

At block 328, the method can include determining whether to perform a remedial action based on the risk level. As discussed herein, if the risk level associated with the security vulnerability is above a predetermined level, a remedial action can be performed, for example.

FIG. 3 illustrates a computing device for open source security monitoring according to one or more embodiments of the present disclosure. Computing device 430 can be used to perform the method as discussed in relation to FIG. 2. As shown in FIG. 3, computing device 430 includes a user interface 410. User interface 410 can be a graphic user interface (GUI) that can provide (e.g., display and/or present) and/or receive information (e.g., data and/or images) to and/or from a user (e.g., operator) of computing device 430. For example, user interface 410 can include a screen that can provide information to a user of computing device 430 and/or receive information entered into a display on the screen by the user. However, embodiments of the present disclosure are not limited to a particular type of user interface.

Figure 4:
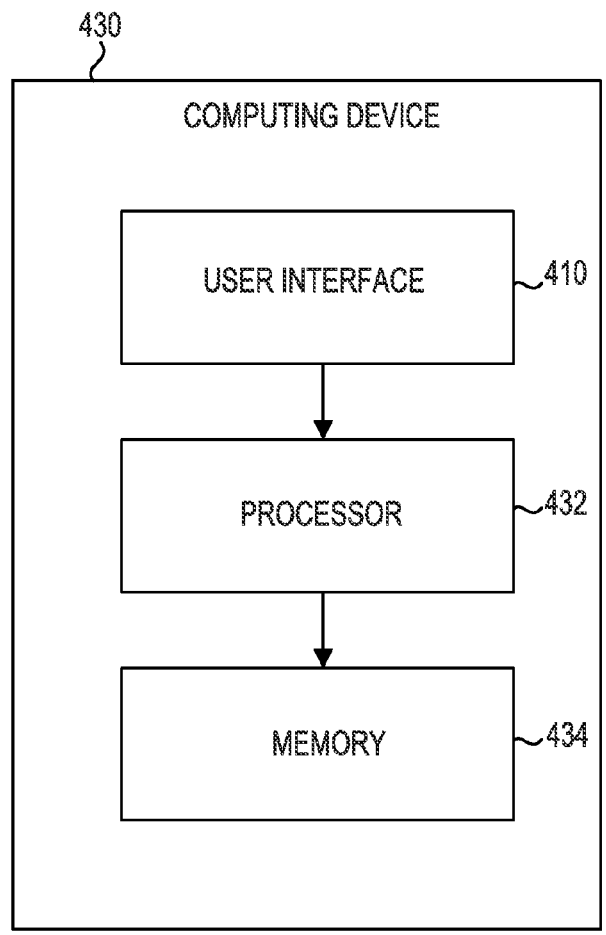
FIG. 4 illustrates a computing device for open source security monitoring according to one or more embodiments of the present disclosure.

As shown in FIG. 4, computing device 430 includes a processor 432 and a memory 434 coupled to the processor 432. Memory 434 can be volatile or nonvolatile memory. Memory 434 can also be removable (e.g., portable) memory, or non-removable (e.g., internal) memory. For example, memory 434 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 434 is illustrated as being located in computing device 430, embodiments of the present disclosure are not so limited. For example, memory 434 can also be located internal to another computing resource (e.g., enabling computer readable instructions to be downloaded over the Internet or another wired or wireless connection). Memory 434 can also store executable instructions, such as, for example, computer readable instructions (e.g., software), for open source security monitoring according one or more embodiments of the present disclosure.

Processor 432 can execute the executable instructions stored in memory 434 in accordance with one or more embodiments of the present disclosure. For example, processor 432 can execute the executable instructions stored in memory 434 to monitor a first piece of data from a first source of open source data. Alternatively, and/or in addition, the processor 432 can execute the executable instructions stored in memory 434 to monitor a second piece of data from a second source of open source data. In an example, the first source of open source data can be the same source as the second source of open source data. Alternatively, and/or in addition, the first source of open source data can be a different source than the second source of open source data.

In an example, the first and second piece of data can be monitored from at least one of a social networking site, a job posting, a forum, online documentation, an online document repository, a web page, and/or metadata from an online document. For example, an individual may intentionally and/or unintentionally leak data that can lead to a security vulnerability in, for example, a post on a social networking site, job posting, web page and/or forum. Alternatively, and/or in addition, data can be leaked in online documentation for a product, an online document repository and or comments regarding an online document that are stored in the metadata from the online document.

In an example, the first piece of data from the first source of open source data can be innocuous. As discussed herein, innocuous data can be defined as data that, by itself, does not pose a security vulnerability to an entity. Alternatively, and/or in addition, the second piece of data from the second source of open source data can be innocuous.

Although the first piece of data and the second piece of data can be innocuous, individually, the first piece of data and the second piece of data can cause the security vulnerability, in combination. For example, as discussed herein, the first piece of data and the second piece of data can each contain vague details regarding an entity, product, and/or project, for example. However, the vague details in the first piece of data and the second piece of data can be combined to form descriptive details regarding the entity, product, and/or project, in an example.

For instance, half of the details about a product can be disclosed in the first piece of data, making an identification of the product not possible. However, the other half of the details about the product can be disclosed in the second piece of data. The combination of the first piece of data and the second piece of data can therefore create a security vulnerability associated with the product details.

The processor 432 can execute the executable instructions stored in memory 434 to analyze whether the first piece of data and the second piece of data combined can cause a security vulnerability to an entity that is related to the first piece of data and the second piece of data. For example, the first piece of data can be combined with the second piece of data to determine whether enough data is disclosed in the combination of the first piece of data and the second piece of data to cause a security vulnerability.

The processor 432 can execute the executable instructions stored in memory 434 to recommend a remedial action based on the security vulnerability. As discussed herein, the remedial action can include an action that provides present and/or future remediation of the security vulnerability. For example, the security vulnerability can be automatically sent to an administrator to remove the security vulnerability and/or an internet posting policy can be created.

In some embodiments, a report can be generated that identifies the first piece of data and the second piece of data when the first piece of data and the second piece of data cause the security vulnerability, in combination. The report can identify a time that the security vulnerability was recognized, a time when the first piece of data and/or second piece of data was posted, an identification of the source of open source data that the first piece of data and/or second piece of data was found, for example. Alternatively, and/or in addition, the report can identify a risk level associated with the security vulnerability, for example.

In some embodiments, a security vulnerability profile can be generated based on the analysis of whether the first piece of data and the second piece of data combined can cause a security vulnerability to an entity. In an example, the security vulnerability profile can be generated for the entity, a product developed by the entity, a project undertaken by the entity, and/or a process developed by the entity. For instance, the security vulnerability profile can be created for different sectors of the entity. This can allow for a security assessment of the entity to be performed, which can be used to determine which sectors are impacted the most by security vulnerabilities. As such, efforts to mitigate and/or fix security vulnerabilities can be directed at sectors that are impacted the most by security vulnerabilities.

In an example, the security profile for a sector of the entity can be generated by aggregating individual security vulnerabilities of the sector. A particular sector may be responsible for a number of projects. In an example, a determination can be made that a security vulnerability exists for some of the projects. To determine the security vulnerability profile for the sector, the individual security vulnerabilities existing for each of the projects can be aggregated into the security vulnerability profile for the sector.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

What is claimed:

1. A method for open source security monitoring comprising:
    searching, by a computer, open source data for data posing a security vulnerability to an entity;
    associating, by a computer, a risk level with the data posing the security vulnerability to the entity;
    analyzing, by a computer, the data posing the security vulnerability to the entity and the associated risk level;
    determining, by a computer, whether to perform a remedial action based on the risk level; and
    creating an internet posting policy based on the analysis of the data posing the security vulnerability to the entity and the associated risk level.

2. The method of claim 1, wherein the method includes:
    analyzing data from multiple sources of open source data, wherein the sources of the open source data are different;
    determining whether a combination of the data from the multiple sources of open source data pose a security vulnerability.

3. The method of claim 2, wherein individual data from each of the multiple sources of open source data is innocuous.

4. The method of claim 2, wherein the data from the multiple sources of open source data in combination poses a security vulnerability to the entity.

5. The method of claim 2, wherein the method includes continuously searching open source data for data posing a security vulnerability to the entity.

6. The method of claim 1, wherein the method includes searching open source data for data associated with an entity.

7. The method of claim 1, wherein the method includes searching open source data for data associated with at least one of a project and product.

8. A machine-readable non-transitory medium storing instructions for open source security monitoring, executable by a machine to cause the machine to:
   monitor a first piece of data from a first source of open source data;
   monitor a second piece of data from a second source of open source data;
   analyze whether the first piece of data and the second piece of data combined causes a security vulnerability to an entity that is related to the first piece of data and the second piece of data;
   recommend a remedial action based on the security vulnerability; and
   create an internet posting policy based on the analysis of whether the first piece of data and the second piece of data combined causes a security vulnerability to the entity.

9. The medium of claim 8, wherein:
   the first piece of data from the first source of open source data is innocuous; and
   the second piece of data from the second source of open source data is innocuous.

10. The medium of claim 8, wherein the first piece of data from the first source of open source data and the second piece of data from the second source of open source data cause the security vulnerability, in combination.

11. The medium of claim 8, wherein the instructions executable by the machine to monitor the first and second piece of data include instructions executable by the machine to monitor the first and second piece of data from at least one of a social networking site, a job posting, a forum, online documentation, online document repositories, a web page, and metadata from an online document.

12. The medium of claim 8, further comprising instructions to generate a report that identifies the first piece of data and the second piece of data when the first piece of data and the second piece of data cause the security vulnerability, in combination.

13. The medium of claim 8, further comprising instructions to generate a security vulnerability profile based on the analysis of whether the first piece of data and the second piece of data combined cause a security vulnerability to an entity.

14. The medium claim 13, wherein the security vulnerability profile is generated for at least one of the entity and a product of the entity.

15. The medium of claim 13, wherein the security vulnerability profile is generated for a sector of the entity by aggregating individual security vulnerabilities of the sector.

16. A system for open source security monitoring, the system comprising a processing resource in communication with a non-transitory computer-readable medium, wherein the computer-readable medium contains a set of instructions and wherein the processing unit is designed to execute the set of instructions to:
   monitor a first piece of innocuous data from a first source of open source data;
   monitor a second piece of innocuous data from a second source of open source data, wherein the first piece of innocuous data and the second piece of innocuous data in combination cause a security vulnerability;
   associate a risk level with the security vulnerability;
   determine whether to perform a remedial action based on the risk level;
   create an internet posting policy based on the risk level associated with the security vulnerability; and
   determine an effectiveness of the internet posting policy based on a number of security vulnerabilities occurring before and after an implementation of internet posting policy.

17. The system of claim 16, wherein the instructions are executed to:
   provide an identification of the first source of the open source data and the second source of open source data; and
   direct that the open source data be removed.

18. The system of claim 16, wherein the instructions are executed to monitor data associated with an outbound communication from the entity.

19. The system of claim 16, wherein the first source of open source data is different than the second source of open source data.

20. The system of claim 16, wherein the instructions are executed to prioritize a plurality of remedial actions based on the risk level of each of the security vulnerabilities.

* * * * *